United States Patent [19]
Goldwasser et al.

[11] Patent Number: 5,241,428
[45] Date of Patent: Aug. 31, 1993

[54] VARIABLE-DELAY VIDEO RECORDER

[76] Inventors: Eric P. Goldwasser, 993 Barberry Rd, Yorktown Heights, N.Y. 10598; Romi E. Goldwasser, 140 E. 46th St., Apt. 6-B, New York, N.Y. 10017

[21] Appl. No.: 669,061

[22] Filed: Mar. 12, 1991

[51] Int. Cl.$^5$ .................. G11B 20/00; G11B 20/10
[52] U.S. Cl. ............................ 360/7; 360/32; 360/39
[58] Field of Search ............. 360/7, 32, 54, 13, 14.1, 360/14.2, 14.3, 39; 369/258, 259; 358/310

[56] References Cited

U.S. PATENT DOCUMENTS

| | | | |
|---|---|---|---|
| 3,341,833 | 9/1967 | Jones | 369/259 |
| 3,645,539 | 2/1972 | Jenkins | 360/7 |
| 3,682,363 | 8/1972 | Hull | 360/13 X |
| 4,283,735 | 8/1981 | Jagger | 358/4 |
| 4,319,286 | 3/1982 | Hanpachern | 360/33 |
| 4,408,309 | 10/1983 | Kiesling et al. | 360/7 X |
| 4,430,676 | 2/1984 | Johnson | 360/13 |
| 4,445,195 | 4/1984 | Yamamoto | 360/13 X |
| 4,633,331 | 12/1986 | McGrady et al. | 360/32 X |
| 4,876,670 | 10/1989 | Nakabayashi et al. | 365/194 |
| 4,891,715 | 1/1990 | Levy | 360/33.1 X |
| 4,963,866 | 10/1990 | Duncan | 360/32 X |
| 4,991,033 | 2/1991 | Takeshita | 360/32 |
| 5,021,893 | 6/1991 | Scheffler | 360/32 X |
| 5,063,453 | 11/1991 | Yoshimura et al. | 360/32 |

Primary Examiner—David Mis
Attorney, Agent, or Firm—Michael M. deAngeli

[57] ABSTRACT

A video recorder and playback device allowing simultaneous recording and playback of program material, including means for controllably varying a time delay between the recording and playback of recorded material. This allows, for example, playback of previously recorded material to be temporarily stopped and then resumed without interrupting the recording of new material. A user can arrange to start recording a broadcast program (while the user is not at home, for example) in the conventional way via stored instructions, and then begin watching the recording several minutes or hours later, before the program is over, without stopping the recording. The user can also interrupt the playback of a program that is being recorded as it is being watched (to take a telephone call, for example), and then resume playback of the program (after the phone call is over) without stopping the recording. The user can then watch the rest of the program delayed by a time period equal to the length of time of the interruption. If there are portions of the program that the user does not want to see (e.g. commercials), he can speed (i.e., fast forward) through those recorded portions and catch up to the live broadcast. The user can also rewind and replay portions of the program as the video recorder continues to record the program.

14 Claims, 4 Drawing Sheets

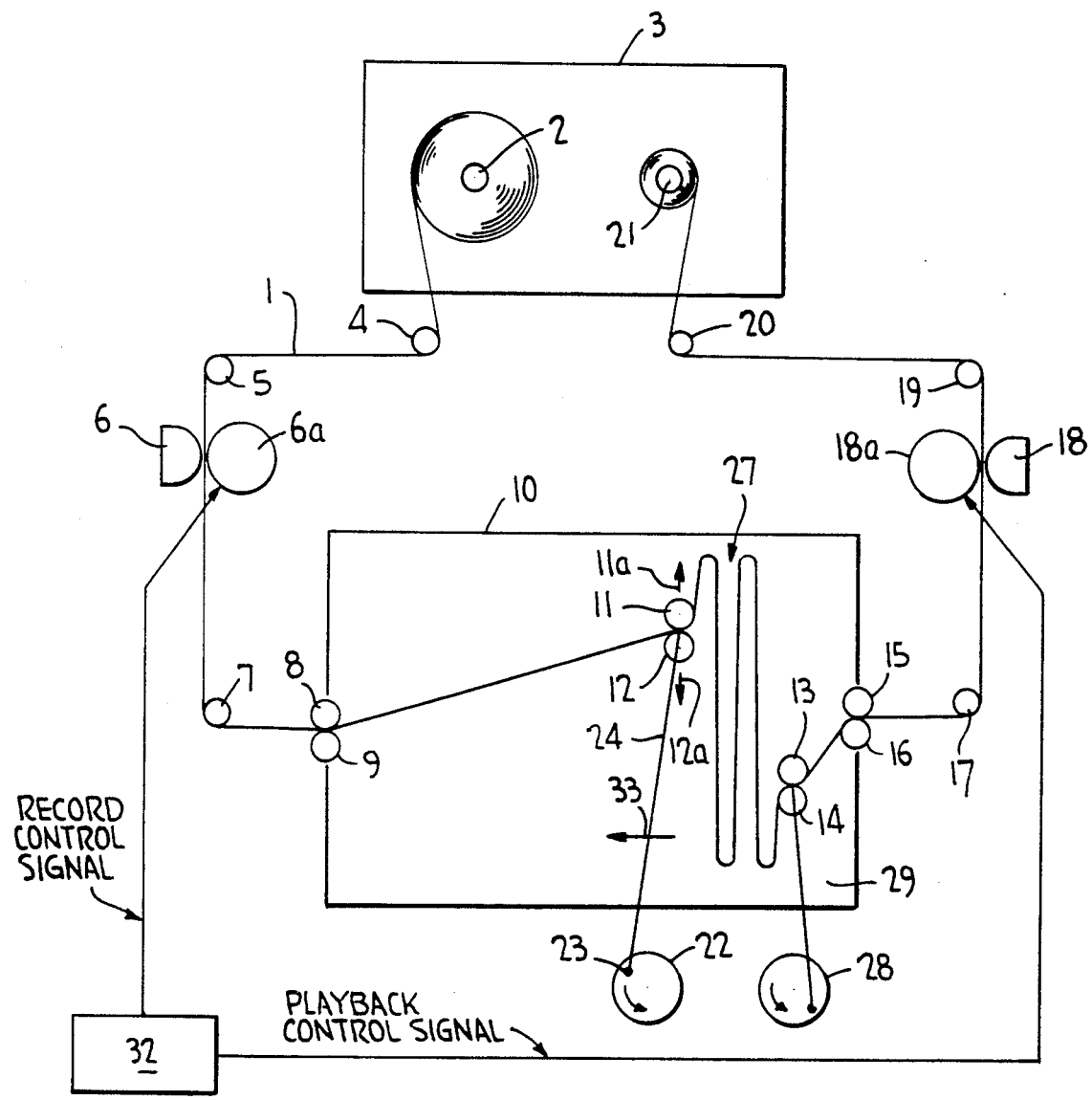

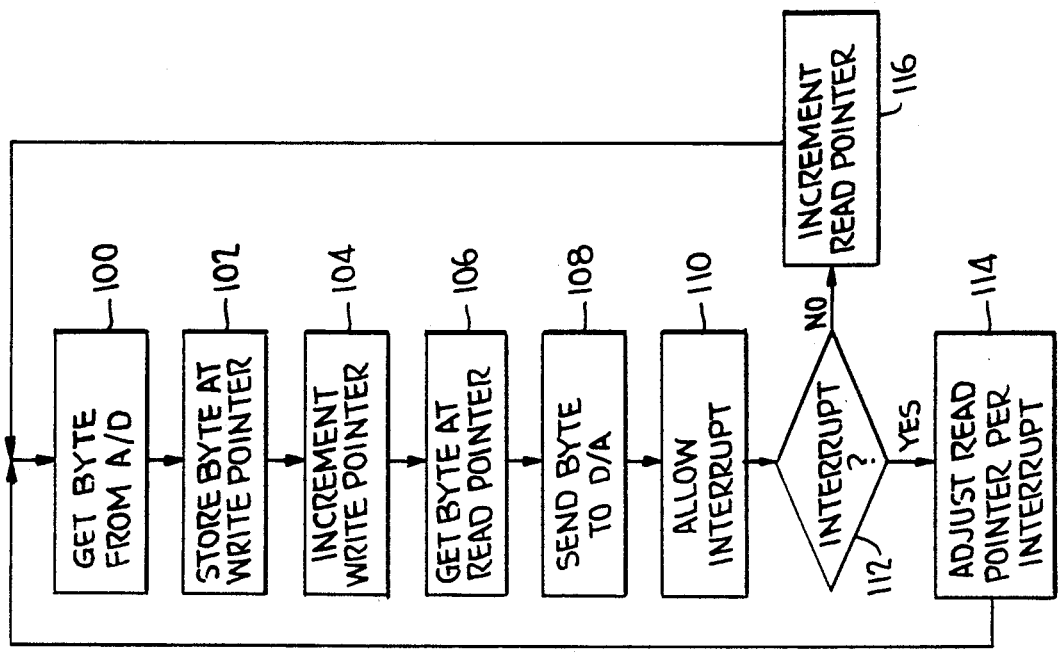
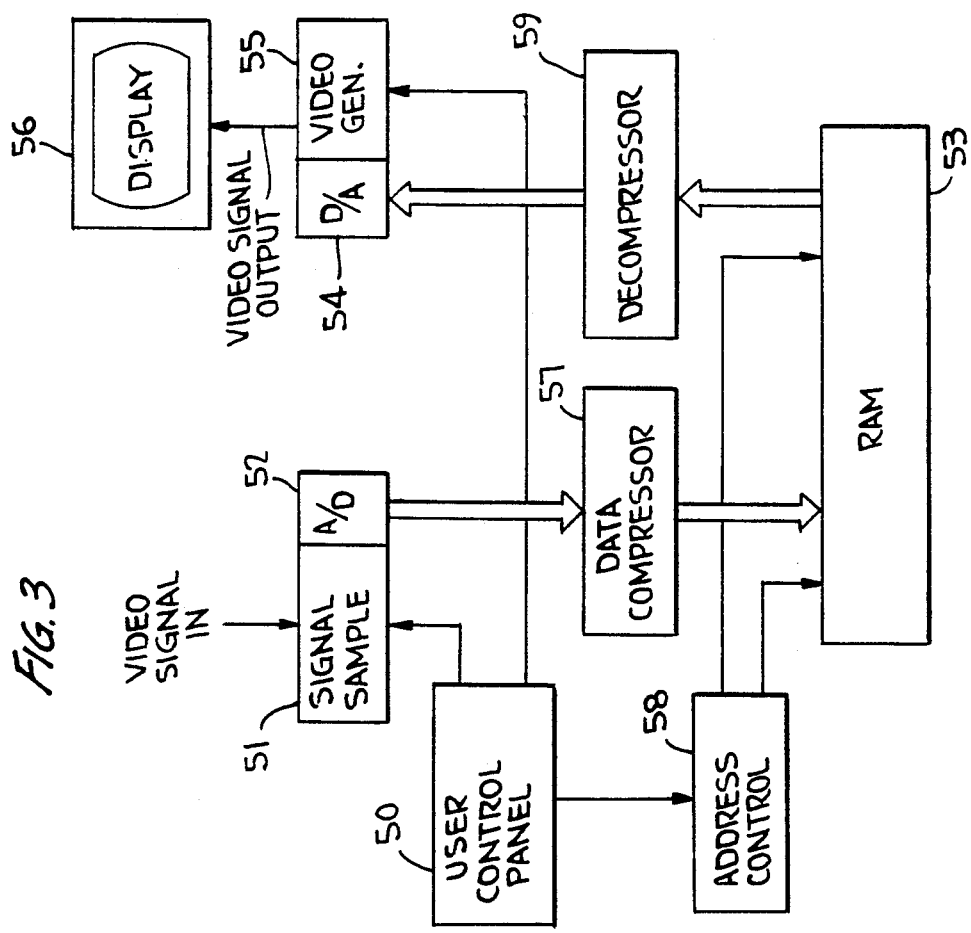

VARIABLE-DELAY VIDEO RECORDER

FIELD OF THE INVENTION

The present invention relates to an apparatus which permits the simultaneous recording and playback of video material with a variable delay between the recording of a given segment of a video program and the subsequent playback of that segment.

BACKGROUND OF THE INVENTION

In the broadcast industry, audio and video recording and playback machines have been used to delay live broadcasts by several seconds to permit deletion of inappropriate language or gestures. These machines provide a fixed delay between the recording and playback of a given section of audio and/or video.

Many commercially available video cassette recorder (VCR) machines, i.e., videotape recorders with multiple heads, permit the user to play back recorded material immediately after it has been recorded, by positioning the play-back head after the record head. This enables the user to monitor the quality of the recording and watch the broadcast essentially live.

These machines do not allow the user to vary the delay between the recording and playback of segments of video.

More particularly, such conventional machines do not allow one to view material as it is being recorded, other than simultaneously or immediately after it has been recorded, as above. This imposes many inconveniences. For example, often one will anticipate arriving home at a particular hour, sometime after the commencement of a particular broadcast program one desires to watch. One must therefore set one's VCR to commence recording at the beginning of the program. If one then arrives a few minutes after the beginning of the program, one can watch the end of the program in real time, but cannot see its beginning until after the entire program has been recorded.

Similarly, often one will be watching a particular program when one must temporarily cease watching it, for example, to take a telephone call or the like. It would obviously be convenient to be able to record the program from that point forward, complete the telephone call, and simply watch the remainder delayed by the length of time of the interruption. However, no devices are now available which permit this facility. It also is not possible to employ two separate video cassette recorders to overcome these inconveniences.

OBJECTS OF THE INVENTION

A principal object of the present invention is to provide an improved video recorder and playback device that can be used to record and playback video material independently, for example, so as to allow the viewer to pause the playback for a variable period of time without interrupting the recording.

A further object of the present invention is to provide an apparatus that can be used to record and playback video material while allowing the user to effectively reposition the stored material with respect to the playback device to allow "fast forward" or "rewind" of the material being played back, without interruption of the recording.

SUMMARY OF THE INVENTION

These objects are achieved, according to the present invention, by recording video on a recording medium while simultaneously playing back previously recorded video from the medium, while allowing control of a variable time delay between recording and playback.

The video recorder of the invention is described in three embodiments. In the first "sequential" and second "random access" embodiments, the functional attributes of the device are identical. In the third "multiple tape" embodiment, the functional attributes are somewhat different.

In the first "sequential" embodiment, the video program material is recorded on a sequential medium, typically videotape. In a second "random access" embodiment, the video signal is converted to digital form and recorded in a random access memory, which can be any of several known types. For example, this random access memory could employ magnetic or optical media or a solid state memory.

More particularly, the term "random access memory" is commonly used to refer to a particular type of solid state memory. The term as used herein includes such solid state devices, but as a consequence of the particular nature of the invention, such devices as magnetic or optical discs, which permit rapid access to essentially any portion of the stored records, are also included. Not included within the term "random access memory" as used herein is tape storage media, which is sequential in character. That is, use of tape media requires that a quantity of tape be physically moved in order to access a particular record (except when sequentially stored records are accessed). This is not true of "random access" memory devices as used herein.

In the first "sequential" embodiment of the invention, the video signal is recorded continuously on tape as in the prior art. The signal can be recorded in analog form as conventional, or could be converted to digital form and stored as a sequence of digital samples. In either case, in this embodiment of the invention, the signal is stored in its original sequence on tape. However, instead of providing a fixed physical spacing between recording and playback heads as in the prior art, the device of the invention comprises an accumulator for physically storing a variable quantity of tape between the recording and playback heads, and comprises separate tape transport mechanisms for driving the tape past the recording and playback heads so that these can be independently controlled.

For example, suppose one has programmed a machine according to the invention to commence recording at a particular time, say 10:00 p.m. One then arrives home at, say, 10:30 p.m. In the interim, the tape recorded by the record head has been physically stored in the accumulator located between the record head and the playback head. Therefore, if one then wants to commence watching the stored program, one can activate the playback drive, driving the tape from the accumulator past the playback head, while the tape continues to be fed into the accumulator, completing the recording of the program. One can readily "fast forward" through unwanted program material such as commercials, while recording the entire program without interruption.

Similarly, if one is watching a program and receives an interruption such as a telephone call or the like, one can cause the program to be recorded while storing the tape in the accumulator. One can subsequently return to the program and watch the portion of the program which has been stored in the interim. If the interruption is comparable in length to the combined length of all unwanted program material, ultimately one may catch up to the program before its end.

In the random access embodiment, the video signal is stored on random access media such as a magnetic or optical disk or in solid state memory. A control device maintains the addresses of the segment(s) of the recorded material in the memory device, so that they can be reassembled in the proper sequence for playback. Typically the video signal will be converted to digital form prior to storage.

In both "sequential" and "random access" embodiments of the invention the video program material is effectively stored in a so-called FIFO (first in-first out) buffer of variable length so that the user can view the video material in the sequence in which it is broadcast, while varying the delay between recording and playback of given material.

In the third "multiple tape" embodiment of the invention, three essentially conventional video tape cassettes (or other tape supply devices) and three separately controllable tape transport mechanisms, with three corresponding record and playback heads, are employed. A microprocessor controls the individual motion of the three tapes past their respective recording and playback heads, responsive to user controls. In this embodiment of the invention, the user can still view a program while a subsequent portion of the program is being recorded. However, the user may experience delays during certain operations of the device. In essence, one of the tapes records while a second can be playing back previously recorded material. The microprocessor maintains a list of the sequence in which the various segments of the program are recorded and can readily play them back in their proper sequence responsive to user instructions.

BRIEF DESCRIPTION OF THE DRAWINGS

The invention will be better understood if reference is made to the accompanying drawings, in which:

FIG. 1 is a schematic diagram of a video recorder in the first "sequential" embodiment of the invention;

FIG. 3 is a schematic diagram of a "random access" embodiment of the invention;

FIG. 4 is a flow chart for a computer algorithm which can be used to implement the features of the invention in the "random access" embodiment of FIG. 3;

DESCRIPTION OF THE PREFERRED EMBODIMENTS

Figure 2A:
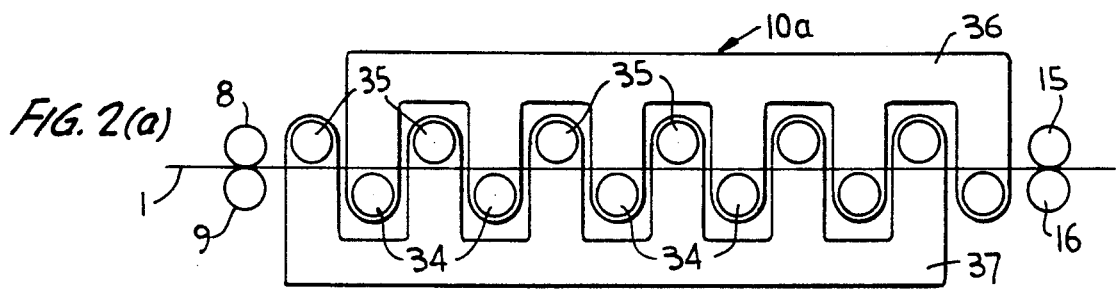
FIG. 2(a), 2(b) and 2(c) show schematically the steps in operation of a particular accumulator for tape which may be useful in implementation of the "sequential" embodiment of the invention of FIG. 1.

As described above, this invention includes three preferred embodiments: a first "sequential" embodiment in which the video program material is recorded on conventional videotape or the like, in its original sequence, a second "random access" embodiment in which the information is stored as addressable blocks of information on a medium other than tape per se, and a third "multiple-tape" embodiment of the invention. In each, the manner of storage of the video signal on the medium is not itself particularly significant. For example, in the first embodiment of the invention, the video signal could be digitized prior to storage rather than stored in analog form as broadcast, and as stored in video recorders as currently used. Due to the sequential nature of tape, comparable facilities for physical handling of the tape are needed to provide variable delay between recording and playback according to the invention, regardless of the actual method of recording employed.

FIG. 1 shows an embodiment of the invention in which tape stored in a conventional video cassette is employed according to the invention to allow variable delay between recording and playback. A supply of video tape 1 is provided wound on the supply spindle 2 of a conventional videotape cassette 3. The tape is threaded past rollers 4 and 5 and the combination of record head 6 and a generally conventional drive mechanism, shown schematically as a capstan 6a. Capstan 6a is controlled by a control circuit 32 which also controls a comparable capstan 18a (or equivalent conventional drive element) driving the tape past the playback head 18. The motion of the tape 1 past the record head 6 and the playback head 18 is thus independently controllable, in contrast to conventional video tape recorders, wherein the tape is driven past the two heads by a single drive mechanism, so that a variable delay between record and playback can not be provided.

The tape leaving the combination of the record head 6 and the capstan 6a passes by roller 7 and is driven by a pair of rollers 8, 9 onto an accumulator tray 10. Pairs of rollers 11, 12 and 13, 14, the operation of which is detailed below, control the disposition of the tape on the tray. Tape is pulled from the tray by rollers 15, 16 before passing by roller 17, the combination of playback head 18 and capstan 18a, and rollers 19 and 20 and is finally wound upon the takeup spindle 21 of the tape cassette 3. At least roller pairs 8, 9; 11, 12; 13, 14; and 15, 16, in addition to spindles 2 and 21 and capstans 6a and 18a, are powered for positive tape motion control, responsive to control signals from controller 32.

When the unit is in record mode, the rollers of pairs 8, 9, and 11, 12 are caused to rotate in opposite directions to pull the tape off the rotating supply spindle 2 past the combination of record head 6 and capstan 6a, and push the tape into the accumulator portion 27 of the tray 10, that is between roller pairs 11, 12 and 13, 14. When the unit is in playback mode, the rollers of pairs 13, 14 and 15, 16 are rotated in opposite directions to pull the tape from the tray 10 and past the combination of playback head 18 and capstan 18a, after which it is wound upon the rotating takeup spindle 21.

If the playback operation is paused during a recording operation, takeup spindle 21, capstan 18a and roller pairs 13, 14 and 15, 16 stop rotating, responsive to control signals from controller 32, while the supply spindle 2, capstan 6a, and roller pairs 8, 9, and 11, 12 continue rotating, so that the tape begins to accumulate in the tray 10 between roller pairs 11, 12, and 13, 14. In order to ensure uniform storage of the tape on the accumulator tray, rollers 11 and 12 are moved back and forth across the tray 10 in a direction perpendicular to the line between the pairs of rollers 8, 9 and 15, 16. This is accomplished by a reciprocation mechanism shown, for example, as including rotating eccentric 22. One end of a rod 24 is affixed to the eccentric at a pivot point 23. The opposite end of rod 24 drives the assembly of rollers 11 and 12 transversely across the tray, as indicated by arrows 11a, 12a. The rollers 11 and 12 and the reciprocating drive rod assembly move linearly along the tray as the tray fills over time, as indicated by arrow 33. This causes the accumulated tape to be deposited in the accumulator portion 27 of the tray 10 in a uniform zigzag pattern, as shown. In some cases, additional devices to control the disposition of the tape on the tray may be desirable; for example a wall preventing the stacked end portions of the loops of tape from extending behind the rollers 11 and 12 may be desirable.

When the playback mode is restarted, capstan 18a, roller pairs 13, 14 and 15, 16 and spindle 21 are set rotating again, responsive to control signals from controller 32, to pull the tape accumulated at 27 past the playback head 18 and onto the takeup spindle 21. In this case the amount of tape in the tray 10 will remain constant as one section of tape moves out of the tray and past the playback head 18 while another section of tape moves past the recording head 6 and into the tray 10.

If the unit is put into fast forward mode, capstan 18a, and roller pairs 13, 14 and 15, 16 pull tape out of the accumulator portion 27 of the tray faster than the rollers 8, 9 and 11, 12 deposit new tape in the tray, so that the amount of tape in the tray decreases.

It will be apparent that independent control of the speed of the capstans 6a and 18a, as well as the associated rollers, under control of the control circuitry 32, is important so that according to the invention a variable delay between recording and playback can be provided. This allows playback to be paused or reversed, or the speed of the tape past the playback head to be increased (in the "speed search" or "fast forward" or "rewind" modes) without affecting the speed of the tape past the recording head.

In order to preserve the normal rewind function, for example, to allow one to see the same scene repeatedly, without impeding the record function, it is important that the recorder also permit tape in the FIG. 1 embodiment to be returned to the tray 10 from the takeup spindle 21. Tape on the takeup spindle 21 can be returned to the tray 10 by reversing the direction of the capstan 18a and roller pairs 13, 14 and 15, 16. Eccentric 28 and rod 29 are provided to drive rollers 13 and 14 back and forth. This ensures the tape is stacked in the regular zig-zag pattern. Moreover, this stacking can be accomplished while tape is entering the accumulator portion of the tray 10 from the recording side via rollers 8, 9 and 11, 12. Hence any section of the recorded portion of the tape can be brought to the playback head 18, and the conventional pause, speed search, reverse search, fast forward, and rewind functions can all be accomplished with respect to the portion of the tape that has already been recorded on, without disturbing recording of new material on the portion of the tape withdrawn from the supply spindle 2.

Figure 2B:
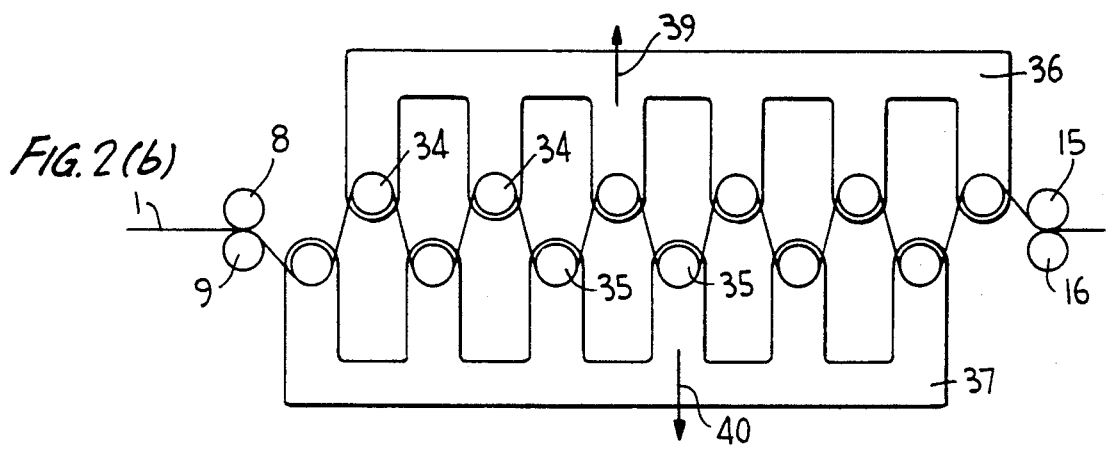
Figure 2C:
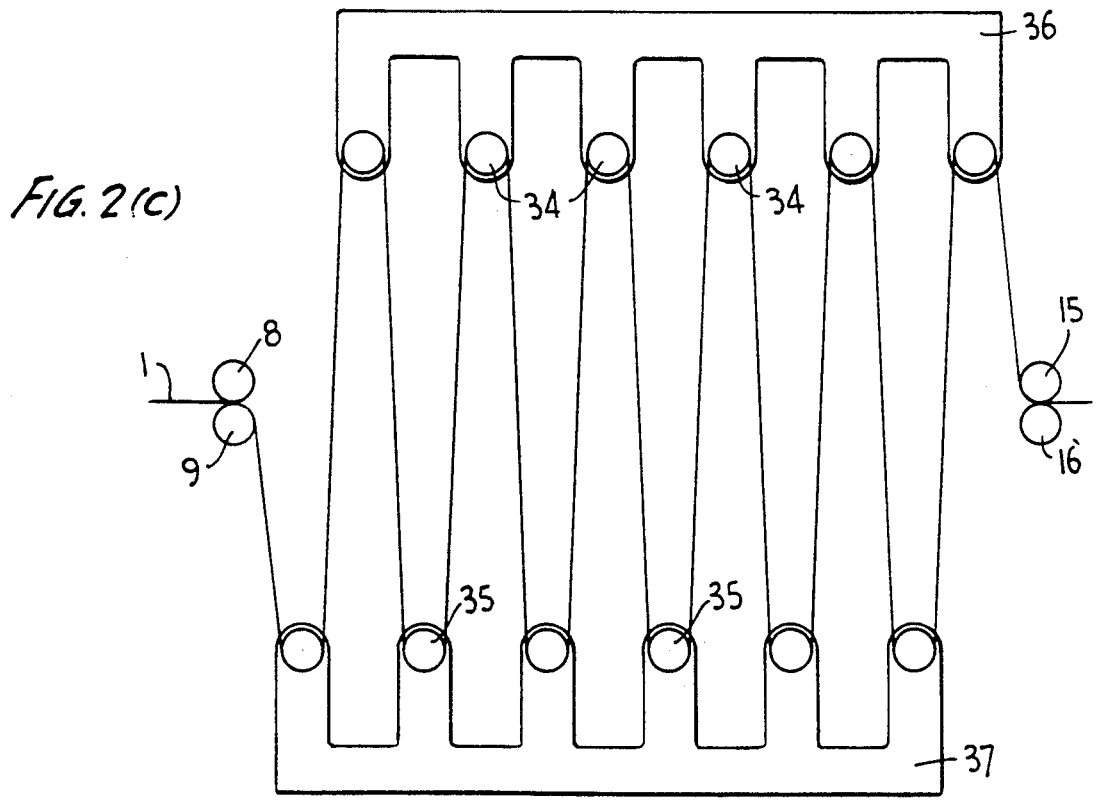

FIGS. 2(a)-2(c) show an alternative embodiment 10a of the accumulator of FIG. 1. In this embodiment, the rollers 8 and 9 drive the tape 1 between sets of opposed idler rollers 34 and 35. The sets of idler rollers are mounted on frames 36 and 37 which are movable with respect to one another as shown by arrows 39 and 40. Relative movement of the sets of rollers allows more or less tape to be stored in the accumulator 10a, depending on the direction of the relative movement. For example, when the record and playback capstans 6a and 18a are operating at the same speed, that is so that no net tape is to be stored in or withdrawn from the accumulator, the sets of idler rollers 34 and 35 are stationary. If it is desired to store tape in the accumulator 10a, for example, so as to enable the viewer to take a telephone call during the recording of a program, the first set of rollers 35 begins gradually to move in one direction away from the line connecting the input rollers 8 and 9 and the output rollers 15 and 16, while the other set of rollers 34 moves in the opposite direction. As shown in FIGS. 2(b) and (c), as these sets of rollers 34 and 35 move further apart, a gradually increasing amount of tape 1 is stored in the accumulator 10a. When it is desired to withdraw tape from the accumulator 10a faster than it is being fed into the accumulator, for example during fast forward playback of a program being recorded, the sets of rollers 34 and 35 are gradually brought closer to one another. The accumulator 10a is simply controlled by controlling the movement of the frames 36 and 37 in accordance with the control signals provided to the capstan 6a and 18a by the controller 32.

FIG. 3 shows schematically a "random access" embodiment of the invention, in which the video signal is stored on a non-sequential medium in digital format.

In this embodiment, the recording device (FIG. 3) includes a signal sampling circuit 51 and an analog-to-digital converter 52 which together create digital samples of the video signal being recorded, which are stored in a random access memory 53. Playback is accomplished by retrieving these stored samples from memory 53 and converting them back via a digital-to-analog converter 54 to an analog video signal. The reconstituted analog video signal is supplied to a video signal generator 55 which outputs a conventional video signal which can be displayed on a standard TV display 56. Recording and playback may be done essentially simultaneously by multiplexing writing to and reading from the memory 53. In this embodiment playback can clearly take place from any portion of the memory and at any speed without affecting the recording. Control of such a random access memory to implement the various desired functions mentioned above is well within the skill of the art.

The locations at which the digitized video samples are stored in the random access memory 53 are controlled by an address controller 58, which in turn is responsive to commands received from a user control panel 50. Operation of the address controller 58 is generally described in connection with FIG. 4.

To conserve the amount of storage space required to store a given quantity of the digitized video signal, the digitized signal can be compressed in a data compressor 57, removing redundant information prior to storage, and decompressed in a decompressor 59 prior to reconstitution by the digital-to-analog converter 54. Such data compressors and decompressors are known per se and the details of their operation are not critical to the present invention.

FIG. 4 shows a flow chart for an algorithm which can be used to control storage and retrieval of such digitized video samples from the memory 53 (FIG. 3). The algorithm is entered at block 100, at which a byte of the digitized video signal is received from the analog to digital converter 52. At step 102, this byte is stored in the memory 53 at an address designated by a write pointer. The write pointer is then incremented by one at block 104. The subsequent byte will thus be stored at the next address in memory 53. This process allows data representing the video signal to be continuously stored. During simultaneous playback, in block 106 a byte stored at a location pointed to by a read pointer is fetched from the memory 53 and sent at block 108 to the digital-to-analog converter 54, which as noted above converts it back to an analog signal which is sent to the display 56. At block 110 the interrupt mask of the computer is checked briefly to allow an interrupt from the user control panel 50. At block 112 any interrupt from the control panel is detected; such an interrupt might indicate, for example, that the orderly playback process implemented by blocks 106 and 108 is to be varied. If so, at block 114 the read pointer is changed to implement the command received via the interrupt. Block 100 is then reentered. If no interrupt is detected, the read pointer is incremented at block 116 and block 100 is reentered, so that both recording and playback continue.

As discussed above, the "sequential" embodiment of FIGS. 1 and 2(a)–2(c) relate to physical storage of tape media in a manner which permits a variable amount of tape to be stored between the recording and playback heads, so as to provide a variable delay between recording and playback times. As discussed in connection with FIGS. 3 and 4, it is also possible to store the video signal as a series of digital samples and to read the data out of the memory as needed for playback purposes. This eliminates the mechanical necessity of storing varying amounts of tape addressed in connection with FIGS. 1 and 2(a)–(c). Thus in the "random-access" embodiment of the invention, the digitized video signal is stored in individually addressable portions, which are accessed in the sequence in which they were stored, to reconstitute the original video signal.

The flowchart of FIG. 4 contemplates that each byte of the digital data representative of the video signal will be stored separately and accessed individually. It will be recognized by those of skill in the art that digitizing a typical video signal results in generation of a large number of data bytes per second, yet that the user does not require access to each data byte separately; in most circumstances, allowing the user to access the signal at one second intervals will be more than adequate. Therefore, the processing steps could be simplified in a manner well understood by those of skill in the art, by storing the digitized data in blocks of length equivalent to one second and allowing the user simply to access these in sequence, through the interrupt routine as described above or the like. Maintaining control of the sequence of blocks of data representing the stored signal is simply a matter of maintaining a list in sequence of the addresses at which the blocks were stored in the memory. The system's response to user commands would be much faster than experienced with conventional video recorders. "Fast forwarding", for example, would be accomplished simply by jumping ahead in the list of addresses.

The selection of the memory type similarly is within the skill of the art, and a particular implementation might involve two memory types. For example, it might be desirable to buffer a small amount of data, e.g., one second's worth, in a solid state FIFO buffer until data compression has been performed, and then store it on a conventional "hard disk" as employed in personal computers. Use of a buffer memory would similarly simplify multiplexing of recording and playback operations to the disk.

Figure 5:
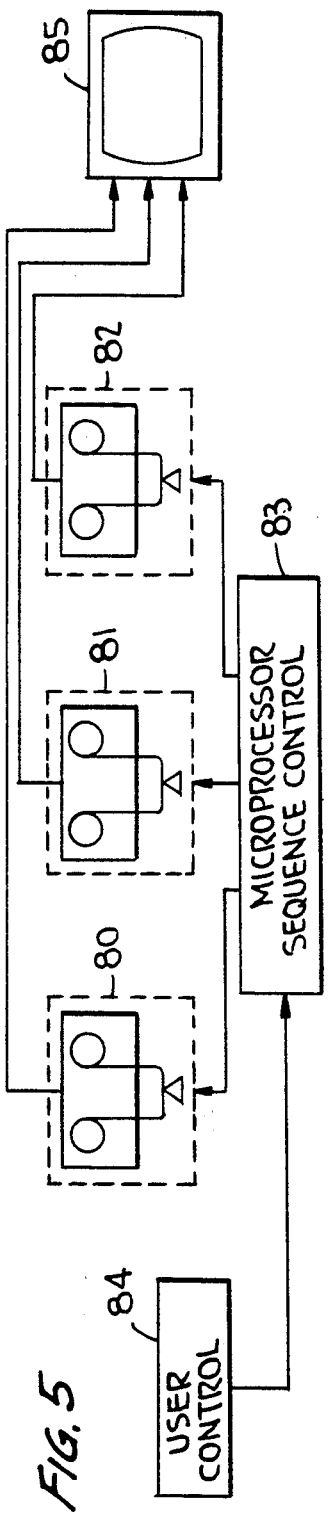
FIG. 5 shows a block diagram of the "multiple tape" embodiment of the invention.

As mentioned above, FIGS. 5 and 6 relate to a further "multiple tape" embodiment of the invention in which at least three individual video tapes are separately provided, each with its own separately controllable transport mechanism and record and playback heads. In this embodiment, the device according to the invention comprises three individual, essentially conventional, videotape recording mechanisms denominated 80, 81, and 82 in FIG. 5. These are individually controlled by a microprocessor or equivalent controller device 83, which is in turn responsive to user controls input at a key pad, remote control device or the like, indicated at 84. These three units 80, 81 and 82 can be considered to be a conventional VCR, or other videotape recorder, each being separately controllable for the usual tape transport functions and for recording and playback of the video signal from the tape. The outputs of the three recorders 81, 82 and 83 are fed together to a single display device 85.

In essence, the three essentially conventional recording mechanisms are used in this embodiment of the invention, so that the novel functions described above can be provided using present day tape transport and recording technology. As noted, functionally these three mechanisms are identical to three conventional tape recorders as presently available, with the exception that they are controlled by the microprocessor rather than directly by the user. It would be impracticably complicated for a user to operate three separately controllable conventional recorders to obtain the functions provided according to the invention.

Figure 6:
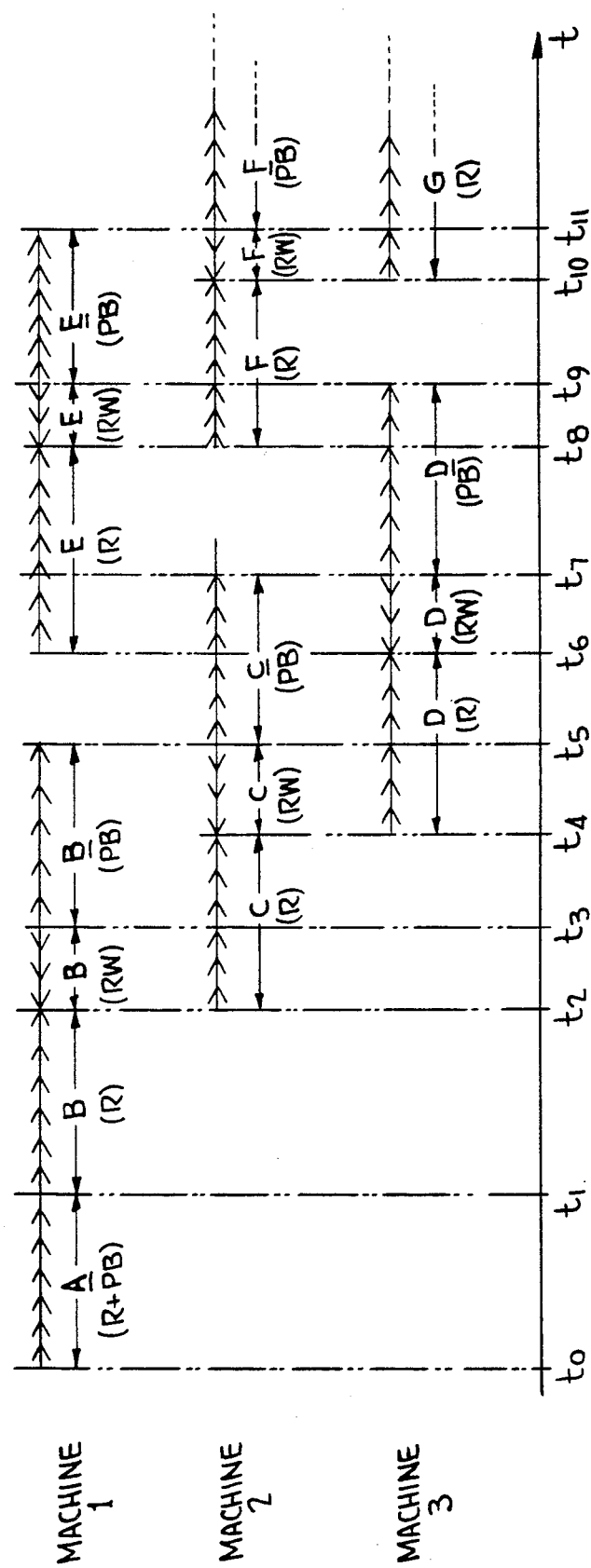
FIG. 6 shows a diagram illustrating the operation of the "multiple tape" embodiment of the invention over time.

FIG. 6 is a diagram showing the sequence of operation of the three recorders 80, 81 and 82, denominated machines 1, 2, and 3, to illustrate the manner in which they are operated to provide the functions of the invention. In FIG. 6, time is shown extending from left to right, and the left and right facing arrow points denote the direction of motion of the tape carried by the corresponding recorder at any particular time $t_1$, $t_2$, ... $t_n$. The letters beneath the arrow points indicate the segment of the program of interest passing the record/playback head of the corresponding machine at any given time, such that the entire program consists of segments A, B, C, D, ... in sequence. The letters which are underlined denote the segment being displayed at any given time. Finally, the letters in parentheses beneath the segment indicators indicate the operation which is being performed by the particular machine at the particular time. Thus, from time $t_0$ to time $t_1$, under segment A for machine 1 there appears the legend "(R+PB)". This indicates that from time $t_0$ to time $t_1$ recorder 1 is both recording and playing back segment A of the program. At time $t_1$, assume that the user needs to take a telephone call. He halts playback so that segment B is simply recorded by machine 1 from time $t_1$ to time $t_2$. He wishes to resume viewing the program at time $t_2$. Between $t_2$ and $t_3$, machine 1 then rewinds the segment of its tape on which segment B is recorded. So that the program is continuously recorded, recorder 2 begins to record segment C at $t_2$. At $t_3$, machine 1 has completed rewinding segment B and begins to play it back. Playback is completed at time $t_5$. Prior to $t_5$, at $t_4$ the microprocessor 83 notes that the playback of segment B is nearly complete, and therefore commences recording segment D on the third machine. Also at $t_4$, machine 2 rewinds segment C. Therefore, when segment B has been completely played at $t_5$, the tape in machine number 2 has already been rewound to the beginning of segment C which is immediately played back, commencing at $t_5$.

The same sequence is then repeated prior to the completion of playback of segment C at $t_7$. That is, prior to $t_7$, the microprocessor rewinds segment D on the third machine commencing at $t_6$, and begins recording segment E in machine number 1 at time $t_6$ as well. As indicated in FIG. 6, the sequence of recording, rewinding, and playback continues until the program is completed.

It is apparent that this would be far too complicated for the ordinary user to accomplish, e.g. using tape counters and three remote control devices to keep track of three conventional VCRs coupled to a single display. On the other hand, it is apparent that in this embodiment of the invention an initial delay period between $t_2$ and $t_3$ will inevitably be occasioned because, in effect, the microprocessor does not "know" when the user will return from his errand. Similar delays can be encountered during certain fast forward and rewind operations, that is, wherein the user commands the system to depart from the direct playback sequence.

There has thus been shown and described a novel apparatus which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are intended to be covered by the claims which follow.

We claim:

1. Apparatus for recording and playing back a video signal comprising:
    means for conversion of said video signal to blocks of digital data suitable for storage on a randomly-addressed digital storage medium;
    a randomly-addressed digital storage medium for storing said blocks of digital data corresponding to said converted video signal;
    means for controlling the storage of said blocks of digital data corresponding to said converted video signal on said storage medium, wherein said blocks are not necessarily stored at a contiguous locations on said storage medium;
    means for playback for reconstituting said blocks of digital data corresponding to the stored video signal as a video signal suitable for driving a display; and
    means for controlling operation of said means for storing and said means for playback such that said converted signal can be continuously stored on said storage medium during either continuous or intermittent reconstitution of the stored signal as a video signal, whereby a user can control a variable delay between the storage and playback of a particular portion of a given video signal.

2. The apparatus of claim 1 wherein said means for controlling operation of said means for storing and said means for playback permits reconstitution of any portion of the stored signal simultaneously with storage of the converted video signal on the storage medium.

3. The apparatus of claim 1, further comprising data compression means, employed in conjunction with said means for conversion, and corresponding data decompression means employed in conjunction with said means for playback.

4. The apparatus of claim 1 wherein said randomly-addressed digital storage medium comprises means for storing said blocks of digital data corresponding to said converted video signal at addressable locations, and said means for controlling operation of said means for storing and said means for playback comprises means assigning addresses in said randomly addressed digital storage medium for storage of the blocks of digital data, means for storage of the assigned addresses, and means for subsequently employing the stored addresses to retrieve the stored digital representations for supply to said means for playback.

5. The apparatus of claim 4, wherein said means for controlling further comprises means responsive to user commands for determining the sequence and rate of retrieval of the stored digital representations.

6. Apparatus for recording a video signal and for playing back the recorded video signal independently of the continued recording thereof, comprising:
    analog-to-digital converter means for continuously converting an analog video signal to a continuous series of digital samples thereof;
    means for dividing said continuous series of digital samples of said video signal into sequential blocks;
    addressable means for storing said blocks of digital samples of the analog video signal, said means for storing being responsive to addressing control signals, whereby said blocks of digital samples are stored at locations in said means for storing which are identified by addresses, wherein said locations at which sequential blocks are stored need not be physically continuous to one another and wherein aid blocks may be retrieved from said locations responsive to signals including said addresses;
    control means for maintaining a list of addresses corresponding to said locations in said means for storing at which said blocks of digital samples are stored, such that in response to a user command, said list of addresses can be employed to retrieve the blocks of digital samples from the means for storing in the original sequence in which the video signal was converted by the analog-to-digital converter means to said series of digital samples; and
    digital-to-analog converter means for converting the series of digital samples retrieved from the means for storing into an analog video signal suitable for driving a video display;
    wherein said control means is responsive to user commands such that storing of blocks of samples may proceed continuously and independently of retrieval of previously stored blocks of samples, and wherein a variable delay between storage and retrieval is provided, said variable delay being controllable by a user.

7. The apparatus of claim 6, further comprising data compression means for compressing the series of digital samples output by the analog-to-digital converter means to a form thereof requiring reduced storage volume, and data decompression means for reconstituting the compressed series of digital samples to their original form prior to supply to said digital-to-analog converter means.

8. The apparatus of claim 6, wherein said control means further comprises means responsive to user commands for determining the sequence and rate of retrieval of the stored digital samples from the means for storing.

9. The apparatus of claim 6 wherein said means for storing comprises random access memory means.

10. The apparatus of claim 9 wherein said means for storing comprises nonsequentially accessed magnetic storage media.

11. The apparatus of claim 9 wherein said means for storing comprises solid state memory means.

12. An apparatus for allowing simultaneous playback and recording of a video program, comprising:
 three essentially identical videotape recording and playback machines, being separately controllable for recording, rewind and playback of sequential segments of the video program on portions of up to three separate tapes;
 a microprocessor, adapted to respond to user commands and to separately control said three identical machines; and
 user control means for permitting the user to provide user commands to said microprocessor for control of said three machines;
 wherein said microprocessor comprises means for maintaining information indicative of the sequence of said sequential segments of the program stored on different portions of said up to three tapes, whereby said microprocessor can reassemble said segments into their original sequence for playback in response to a single user command.

13. A method for recording and playing back a video signal corresponding to a program, whereby a viewer may play back a previously recorded sequential segment of said program while recording of subsequent sequential segments of said program continues, comprises the steps of:
 continuously converting said video signal to a converted form suitable for storage on a storage medium;
 continuously storing segments of said converted signal corresponding to one or more sequential segments of said program on one or more storage media, while maintaining a record of the locations on said storage media at which the segments of the converted signal are stored, and a record of their order in said program;
 reconstituting and playing back the stored segments of the converted signal in their order in said program responsive to viewer commands;
 wherein said step of reconstituting and playing back is performed responsive to viewer commands and independently of said steps of converting and storing, whereby a variable delay controllable by the viewer is provided between the time of storing and the time of playback of particular portions of said program.

14. The method of claim 13, comprising the further steps of compressing said converted signal prior to storing and decompressing said signal as part of reconstitution thereof.

* * * * *